United States Patent
Duc et al.

(10) Patent No.: US 8,306,783 B2
(45) Date of Patent: Nov. 6, 2012

(54) METHOD FOR DETERMINING FAULTY COMPONENTS IN A SYSTEM

(75) Inventors: Nghia Dang Duc, Hildesheim (DE); Peter Engel, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 635 days.

(21) Appl. No.: 12/459,994

(22) Filed: Jul. 9, 2009

(65) Prior Publication Data
US 2010/0017167 A1    Jan. 21, 2010

(30) Foreign Application Priority Data
Jul. 16, 2008  (DE) .................. 10 2008 040 461

(51) Int. Cl.
G06F 11/00  (2006.01)
(52) U.S. Cl. ...................................... 702/185
(58) Field of Classification Search .............. 702/58, 702/59, 81, 90, 113, 118–120, 181–185, 702/188; 714/26, 47.1, 47.2
See application file for complete search history.

(56) References Cited

U.S. PATENT DOCUMENTS

| | | | |
|---|---|---|---|
| 2006/0235707 A1 | 10/2006 | Goldstein et al. | |
| 2007/0088982 A1* | 4/2007 | Guralnik et al. | 714/26 |
| 2008/0104453 A1* | 5/2008 | Mukherjee et al. | 714/47 |

FOREIGN PATENT DOCUMENTS

| WO | WO 2004/010646 | 1/2004 |
|---|---|---|
| WO | WO 2008/012486 | 1/2008 |

* cited by examiner

*Primary Examiner* — Mohamed Charioui
(74) *Attorney, Agent, or Firm* — Kenyon & Kenyon LLP

(57) ABSTRACT

In a method for determining faulty components in a system having a plurality of interacting components, lists of potentially faulty components are prepared as a function of different diagnosis algorithms implemented independently of each other, and an error value is assigned to each potentially faulty component. The error values for at least one selection of components of the system are linked to form an error score value for a particular potentially faulty component.

7 Claims, 4 Drawing Sheets

| Symptom | Symptom 1 | | Symptom 2 | | Symptom 5 | | Result | | Score |
|---|---|---|---|---|---|---|---|---|---|
| Component | positive | negative | positive | negative | positive | negative | positive | negative | |
| Component 1 | X | | | X | | X | 1 | 2 | -1 |
| Component 2 | X | X | X | | X | 0 | 3 | 0 | 3 |
| Component 3 | | X | X | X | | X | 0 | 3 | -3 |
| Component 4 | | X | | X | | X | 1 | 2 | -1 |
| ... | | | | | | | | | 0 |
| Component n | | X | | | | X | 0 | 3 | -3 |

Fig. 3

METHOD FOR DETERMINING FAULTY COMPONENTS IN A SYSTEM

BACKGROUND OF THE INVENTION

1. Field of the Invention

The present invention relates to a method and a device for determining faulty components in a system, e.g., as it is required in an error diagnosis for a motor vehicle by a service facility.

2. Description of Related Art

In complex systems, which are made up of many components or devices as in the case of current motor vehicles, for example, the error search in the event of operating malfunctions, e.g., in a breakdown or during servicing to be carried out at regular intervals, takes place at the service station, usually by diagnostic systems. To this end, sensor data or historical information of the driving operation are read out and evaluated. For example, if a defect has occurred, then the most likely error cause, e.g., the malfunction of a specific component or device in the vehicle, is determined on the basis of the read-out data. Score tables, for instance, are used for this purpose, or the read-out vehicle data are compared with defect or error scenarios that are based on functional models of the vehicle or the interplay of its components. Additional diagnosis options are known for determining the components causing the particular malfunction. However, the various diagnosis methods utilized do not always determine the defective unit in the vehicle or system correctly. It is therefore desirable to provide the most reliable determination method possible for ascertaining the causes of malfunctions in systems having a plurality of parts or components.

BRIEF SUMMARY OF THE INVENTION

In accordance with the present invention, a method is provided for determining faulty components in a system having a plurality of interacting components. Lists of potentially faulty components are prepared as a function of various diagnostic algorithms implemented independently of each another. Each potentially faulty component is assigned an error value. The error values for at least one selection of components of the systems are linked to form an error score value for a particular potentially faulty component.

A device for determining faulty components in a system having a plurality of interacting components includes a plurality of diagnostic devices, which are configured to prepare a list of potentially faulty components while implementing a particular diagnosis algorithm. The list includes an assigned error value for each potentially faulty component. Furthermore, the device has an evaluation device, which for at least one selection of components of the system, links the error values in order to form an error score value for a particular potentially faulty component as a function of the lists.

Interacting components or devices form a system, e.g., devices of a motor vehicle, which at least in part make up the vehicle. Interacting components are to be understood as components that are at least partially adapted to each other in the functioning or the operation of the system, it being possible for the particular functions to be dependent upon each other. For example, in a motor vehicle the vehicle lights, as one component, depend on the status of the vehicle battery as additional component. Components may also mean sensors, which provide measured values for various system data that may be used as indicators of particular operating states of the system.

A deviation of specified system data or sensor data from setpoint data, for example, may be used as symptom for a faulty component in the system or for a faulty function of the system. For instance, it is conceivable that the deviation between the fill level of the vehicle's fuel tank and a setpoint range is able to be determined as a symptom of the malfunction of the entire vehicle. As a rule, the evaluation of a single corresponding symptom will be insufficient for determining the causal components in a complex error diagnosis.

Therefore, the method and the device for determining faulty components provides for the implementation of different diagnosis algorithms, which basically assign an error value to each component of the system as a partial result. This error value may be understood as a probability of a defective function of the particular component. Because of the implemented diagnosis algorithms, in one variant of the method, an ordered list of the potentially defective components in the order of their probability will be the cause of a defect of the function and/or a sub function of the system. Then a linking of their assigned error values from the prepared lists is implemented, preferably for each component of the system. The error values of a particular component may be added up, for instance. Depending on the use of the measure for the probability as a function of the particular error values, a score table will then result, which, for instance, lists at the highest level the particular components that are most likely responsible for a defect of the system.

In a still further variant of the method, in particular in the event that a vehicle is evaluated as a system, the readout of system or vehicle data takes place, which include sensor data of the components. When setting up at least one of the lists, it is also possible to take externally input symptom data, e.g., defects described by the driver or errors of the vehicle during operation, into account. Furthermore, a control device of the system, e.g., an engine control, may take vehicle data into account that is output at a corresponding data bus.

Moreover, the present invention relates to a computer program product, which induces the implementation of a corresponding method on a program-controlled computing or control device. For instance, a PC or a computer for the control of a vehicle diagnosis system in service facilities, on which corresponding software or a computer program product is installed, may be used as program-controlled computing or control device. The computer-program product may be implemented in the manner of a data carrier such as, for example, a USB stick, floppy disk, CD-ROM, DVD, or also on a server device as a program file able to be downloaded.

BRIEF DESCRIPTION OF THE SEVERAL VIEWS OF THE DRAWING

FIG. 3 shows an example of a score table.

DETAILED DESCRIPTION OF THE INVENTION

Figure 1:
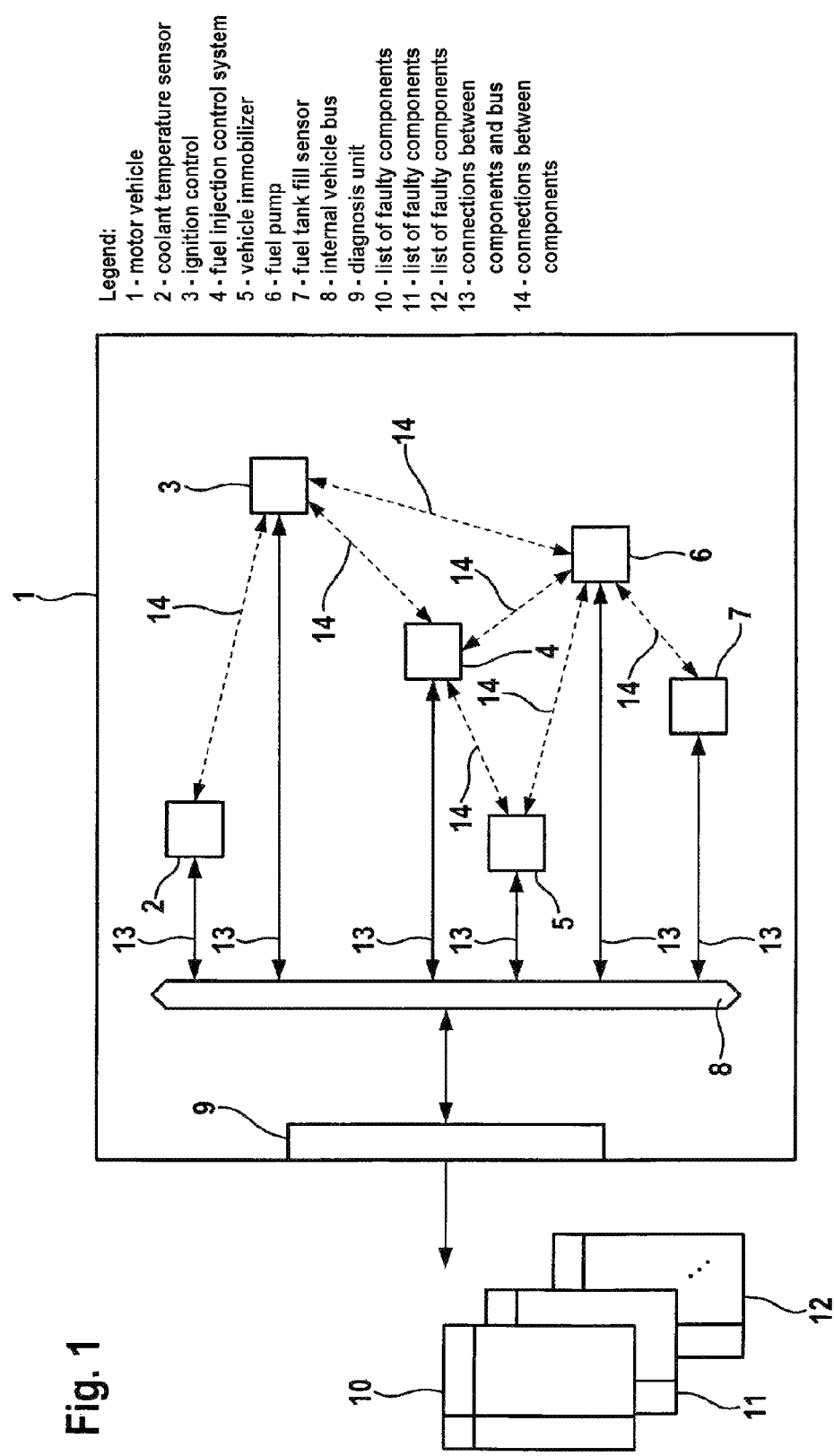
FIG. 1 shows a schematic representation of a system having a plurality of components.

FIG. 1 schematically illustrates a system having a plurality of components. The system, e.g., a motor vehicle 1, is made up of a plurality of devices 2, 3, 4, 5, 5, 7, which may have an at least partial reciprocal effect on each other. This is indicated by arrows 14. Quite generally, system 1 may include components or devices 2 through 7, which, in merely exemplary fashion in connection with vehicles, may be components such as a coolant temperature sensor 2, an ignition control 3, a gasoline or fuel injection control system 4, a vehicle immobilizer 5, a fuel pump 6, and a fuel tank fill sensor 7.

In modern vehicles or systems, the various components 2 through 7 are coupled to an internal vehicle bus 8, as indicated by arrows 13 in FIG. 1. An example of an interaction or a mutual dependency of components 2 through 7 is that if the tank holds insufficient fuel, which is able to be detected by sensor 7, a fuel pump 6 will be unable to deliver fuel in coordination with fuel injection control system 4. To this extent, the superposed engine control is likewise unable to induce an ignition via ignition control 3 if vehicle 1 has run out of fuel. A vehicle immobilizer 5, as well, is able to influence fuel injection control 4 if, for example, no authentication by the owner of the vehicle is present.

If the vehicle then has a breakdown or shows an error, it will be necessary to determine the particular component 2 through 7 that is responsible for the error. Given suitable programming and the use of a plurality of diagnosis algorithms, a diagnosis unit 9, which is coupled to internal vehicle bus 8, determines lists of potentially faulty components 10, 11, 12, which are taken into account in a subsequent diagnosis and evaluation stage. Lists 10, 11, 12 are then analyzed, and subsequently all potentially faulty components are listed in the order of their error probability, in the form of a score table.

Figure 2:
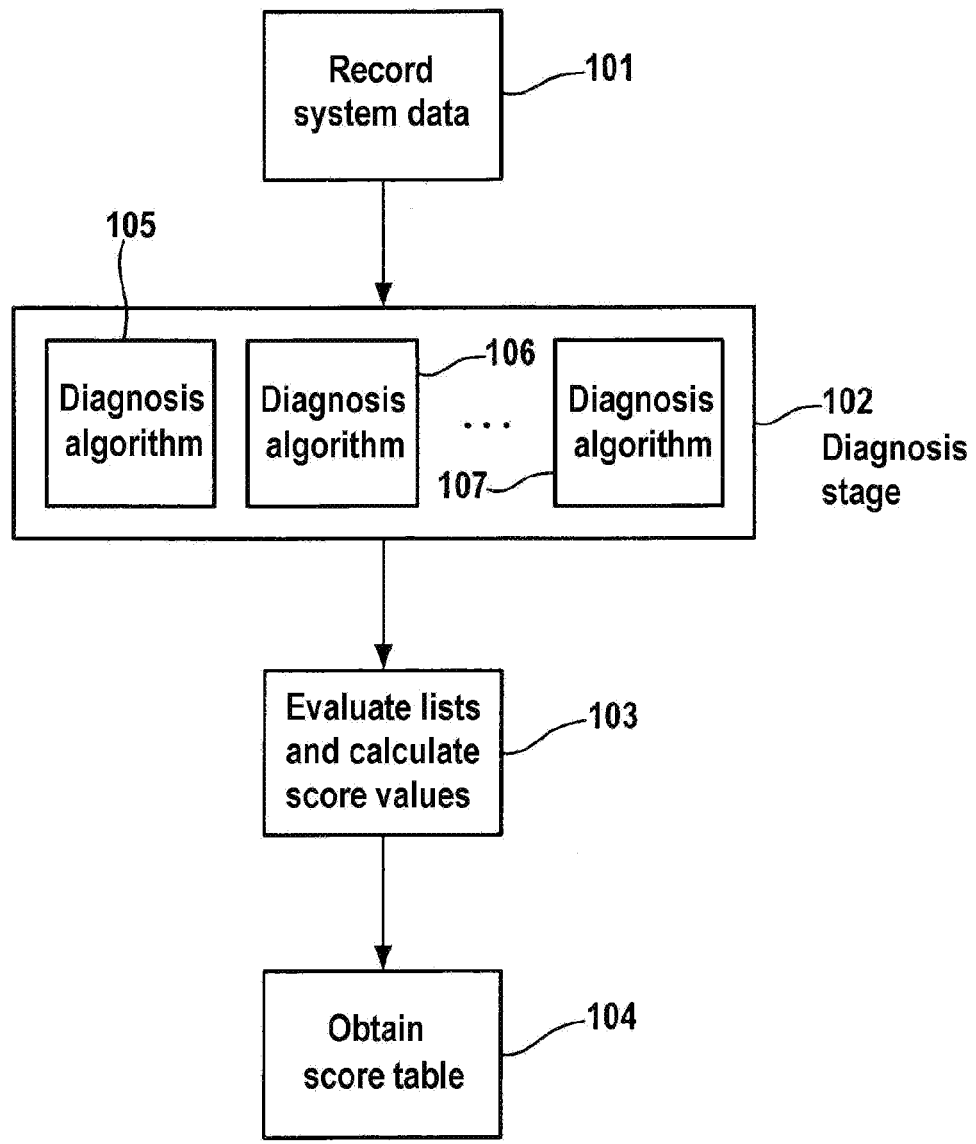
FIG. 2 shows a flow chart of an exemplary implementation of a method for determining faulty components.

A flow chart of a corresponding method for determining the faulty components is shown in FIG. 2. In a first step 101, system data are recorded, e.g., the sensor data supplied by components 2 through 7, or status data of individual components 2 through 7, for instance. For example, fuel tank fill sensor 7 may transmit the fill status of the tank as a percentage. In a further diagnosis stage 102, various diagnosis algorithms 105, 106, 107 are carried out, for instance in parallel. Possible diagnosis algorithms are explained in greater detail in the following text.

A particular diagnosis algorithm supplies a list of potentially faulty components that are most likely responsible for the faulty functioning of the system or the vehicle according to the diagnosis algorithm. So-called symptoms, for instance, may be used for this purpose in order to determine whether a component is likely to ensure reliable functioning or whether it is possibly defective. A deviation of the measured variable from a setpoint value, e.g., a coolant temperature, an exhaust-gas temperature, a coolant, lubricant or further operating fluid temperature, rotational speeds, pressures or other variables characterizing an operating state of the system or vehicle may be used as symptoms.

On the basis of a plurality of diagnosis algorithms, lists, such as ordered lists, for example, of special defective or faulty components are then available, i.e., lists in which the components that are part of the system are listed according to the probability of their sub-optimal functioning. In step 103, the individual lists are evaluated, and a score value or an error score value is calculated for each provided component.

This may be accomplished in that, for example, the error values assigned in the individual partial lists are added to the components for each component. Weighting of the error values with regard to the reliability of the used diagnosis algorithm 105, 106, 107 is also an option in this context.

In step 104, a score table is obtained as a result of the analysis of the individual lists in step 103, which has assigned an error score value to each component of the system. The particular component with the highest error score value, for instance, is then considered the error cause or error source.

For illustration purposes, a score table as such is shown in FIG. 3 by way of example. The first column lists the components 1-$n$ included in the system. In a heuristic diagnosis algorithm, various symptoms are evaluated for each component, such as a percentage deviation of a sensor value or measured value from a setpoint value, and for each symptom a decision is made as to whether the determined component data speak for or against the occurrence of an error. In the first line of the table shown in FIG. 3, the presence of symptom 1 was marked. However, symptoms 2 and 5 are absent in component 1. In the fifth column, a hit thus results for component 1 for the presence of a fault, and two hits for the absence of a fault or the symptom. The number −1, for example, results as score value. A similar symptom analysis takes place for components 2, 3, 4 through n. The resulting score values are indicated in the last column of FIG. 3.

Using the score values, it is now possible to prioritize the potential solutions of the diagnosis problem. For the score values indicated in FIG. 3, component 2 is listed in first place, components 1 and 4 in second place, and components 2 and n in third place. When using the score table in FIG. 3, it is therefore most likely that component 2 exhibits a function error.

The provided method for determining the individual faulty component in the system does not use a single score table. Instead, additional diagnosis algorithms are employed, each providing a prioritized list that includes the potentially faulty components. A diagnosis algorithm based on score tables is merely one possibility that may be considered. Further diagnosis algorithms, which provide individual prioritized lists that sort the components according to the probability that an error has occurred, for example, are a fault tree analysis, a selection effect analysis, model-based diagnosis forms, diagnosis option analyses using symptom cause matrices, heuristic knowledge that allows particular error states of the system to be inferred given specific symptom or component data combinations, for example.

Figure 4:
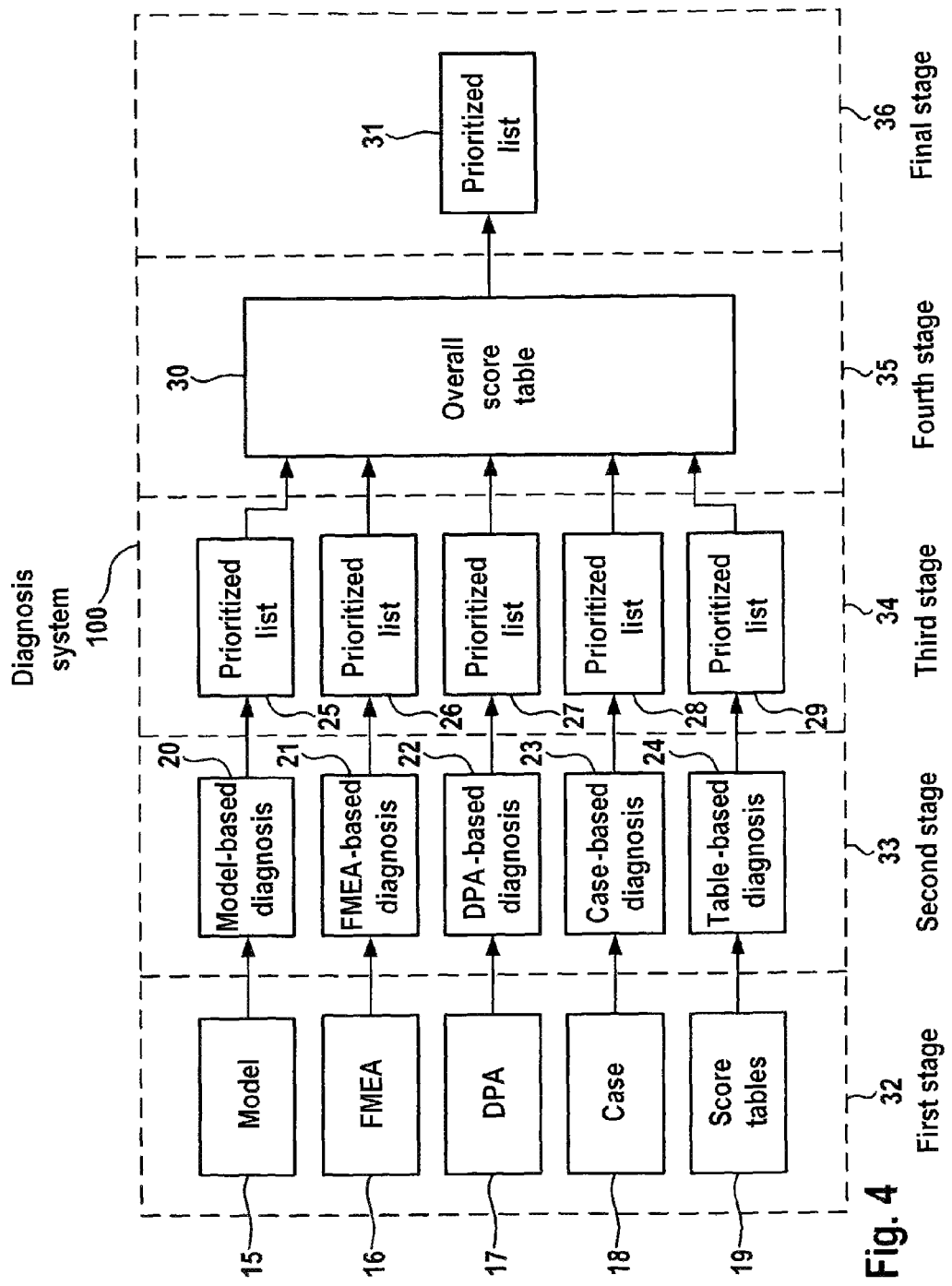
FIG. 4 shows a schematic representation of an exemplary embodiment of a diagnosis system for determining faulty components.

FIG. 4 schematically shows an exemplary embodiment of a diagnosis system for determining faulty components. Diagnosis system 100 has a multi-stage design. In a first stage 32, diagnosis information for different diagnosis algorithms is provided. This could be, for example, fault tree data of an algorithm using heuristic knowledge of the system. The implementation of different diagnosis algorithms is provided in second stage 33. Third stage 34 corresponds to the prioritized lists of potentially faulty components supplied by the diagnosis algorithms, as they are supplied by the various diagnosis algorithms running potentially in parallel. Fourth stage 35 provides for entering the particular lists from previous stage 34 into a score table. In final stage 36, the evaluation of the error score values in the score table from previous stage 35 results in the prioritized list as overall diagnosis result, which lists the components with the highest error probability in first place. Repair steps may then be taken for the listed components.

Diagnosis system 100 may also be realized in computer-implemented manner, in which the various stages may correspond to computer routines, for example. FIG. 4 shows five different diagnosis algorithms by way of example, which may be used to set up an individual prioritized list of potentially faulty components. The overall list is denoted by 31. In a model-based diagnosis 20, a model 15 of the system is provided, for instance of the motor vehicle and its individual components. Model 15, which is frequently implemented by computer, can thus use the detected sensor and operating state data of the individual components to calculate the probable operating state. This is done in a corresponding calculation unit 20, which implements the model-based diagnosis algorithm. The corresponding functional model of the system employed may be structured hierarchically, for example, a plurality of sub systems are modeled essentially separately from each other. For instance, the brake system and the engine system may be designed to be hierarchically dependent upon each other. In that case all individual component models form the functional model of the vehicle. Model-based diagnosis method 20 then provides a prioritized list 25 as partial result, which, for example, lists as error values of the components their positions in the prioritized list. The required data for using the model for the vehicle may be taken from a control device, for instance. Physical measuring variables may also be determined with the aid of sensors, e.g., the voltage, pressure, exhaust-gas pressure or others. Furthermore, subjective observations of a service facility employee, for instance, are also able to be forwarded to the model. Noises or results of a visual inspection, in particular, are taken into account in this context. By comparing the actual behavior of the vehicle, or the measured sensor values or acquired operating state data of the vehicle, with the behavior determined by the model, it is possible to assign higher error values to especially suspected components. A combination with a fault tree analysis is possible as well.

Another potential diagnosis algorithm is the failure mode and effects analysis (FMEA). FMEA is mostly used in the design and development stage of the products, i.e., the vehicle, and is especially prevalent among sub-suppliers for automobile manufacturers. As a result, early identifications of potential error sources are stored during the design phase. FMEA is known as analytical method of reliability engineering for locating potential weak spots of systems. In the corresponding diagnosis, the system, i.e., the vehicle, is broken down into its elements or components. Each element or each component is assigned a risk as to whether a particular defect will occur. The malfunction probability of the particular component is able to be determined as a function of this error or defect occurrence risk. This is realized by a corresponding algorithm, which is denoted by 21. The obtained result once again is a prioritized list 26 as partial result listing components that may be faulty.

Box 17 and box 22 correspond to a diagnosis possibility analysis (DPA) as diagnosis algorithm. Symptom-cause matrices and method-cause-matrices are used for this purpose. Knowledge of symptoms and their cause is assumed, which is possible especially during the development phase of the individual components and sub systems. In error situations, specific feedback in the form of component data is taken into account. The DPA also provides a prioritized list 27 of components having potential errors.

Finally, a case database 18 may be used, in which specific error configurations are detected, i.e., combinations of data values of operating states of the components that correspond to a particular specified error state. To this extent, a corresponding fall database 18 is a stored collection of cases with problem or fault-resolving approaches and detailed recording of the symptoms. A corresponding diagnosis algorithm 23 searches database 18 for the most similar case for the present system or component data combination and uses it to determine a list with the probably faulty components 28 therefrom.

Finally, a diagnosis algorithm 24 as shown in FIG. 3, for instance, with score tables 19 is used to prepare a prioritized list 29. This list may be, for instance, the assignment of the score value from the last column of the table in FIG. 3 to the components in the first column.

Thus, a plurality of prioritized lists 25 through 29 with potentially faulty components of the system is available in third stage 34 of diagnosis system 100. For example, prioritized list 25 may include a sequence of the components illustrated in FIG. 1 according to their error probability, based on evaluation algorithms 20 through 24. From this, an overall score table 30 is determined, the individual error values assigned to the components being added up for each component, for instance. Weighting of the error values as a function of the reliability of the used analysis algorithms 20 through 24 is possible as well in this context.

Each component of the system is thus assigned an error score value, and the error score value has been generated as a function of the various prioritized lists 25 through 29. For example, if vehicle immobilizer 5 is listed in first place in each prioritized list 25 through 29, then this component 5 will also receive the highest score value in overall score table 30. In other words, it is considered the most likely error source. From the calculated error score values for the individual components, a prioritized list 31 is generated as the overall result in final algorithm stage 36. In the previously examined case, vehicle immobilizer 5 will be listed in first place, so that the service station personnel will first check this component thoroughly.

The implementation of the method or the discussed method steps is able to be carried out by functional blocks 15 through 31, shown in FIG. 4, as devices as well. One skilled in the art will know which parts of the method of the afore-described evaluation operations are implemented in each case. For instance, block 16 may be a storage device with FMEA data. Accordingly, the devices are designed in such a way that the particular method steps are implemented and executed. To this extent, functional blocks 15 through 31 of FIG. 4 may also be considered program modules or routines, which are used to implement the particular function.

The present invention is not limited to the error diagnosis in vehicles. Other complex systems having interacting components are likewise able to be examined according to the afore-described aspects of the evaluation and diagnosis methods.

What is claimed is:

1. A method for determining a faulty component in a system having a plurality of interacting components, comprising:
generating, by a plurality of diagnosis devices, a plurality of lists of potentially faulty components using a corresponding plurality of different diagnosis algorithms implemented independently of each other;
assigning, for each potentially faulty component, an error value corresponding to a probability of a defective function of each potentially faulty component as a function of a symptom;
for at least one set of components of the system, linking, by an evaluation device, the error values to form an error score value for each potentially faulty component as a function of the plurality of lists;
assigning a respective error score value to each potentially faulty component; and
determining the faulty component based on the respective error score value assigned to each potentially faulty component.

2. The method as recited in claim 1, wherein one of (i) a deviation from specified system data, or (ii) a deviation of sensor data from setpoint data, is used as the symptom for a faulty component of the system.

3. The method as recited in claim 2, wherein the different diagnosis algorithms determine the potentially faulty components as a function of at least one of: (a) a fault tree for the system; (b) a failure mode and effects analysis; (c) a functional model of the system; (d) a symptom-cause matrix; and (e) an error case database.

4. The method as recited in claim 2, wherein system data are considered in generating the lists of potentially faulty components, wherein the system data include at least one of sensor data of the components, externally input symptom data, and data output by a control device of the system.

5. The method as recited in claim 1, wherein the error score value is determined by adding up the error values of a particular component.

6. A device for determining faulty components in a system having a plurality of interacting components, comprising:

a plurality of diagnosis devices configured to generate a plurality of lists of potentially faulty components using a corresponding plurality of different diagnosis algorithms implemented independently of each other, wherein the lists each include an associated error value for each potentially faulty component; and an evaluation device configured to perform, for at least one set of components of the system, linking the error values to form an error score value for each potentially faulty component as a function of the plurality of lists.

7. The device as recited in claim 6, wherein the components are devices of a motor vehicle.

* * * * *